F. G. MARBACH.
GEARING.
APPLICATION FILED MAY 8, 1909.
1,089,065.
Patented Mar. 3, 1914.
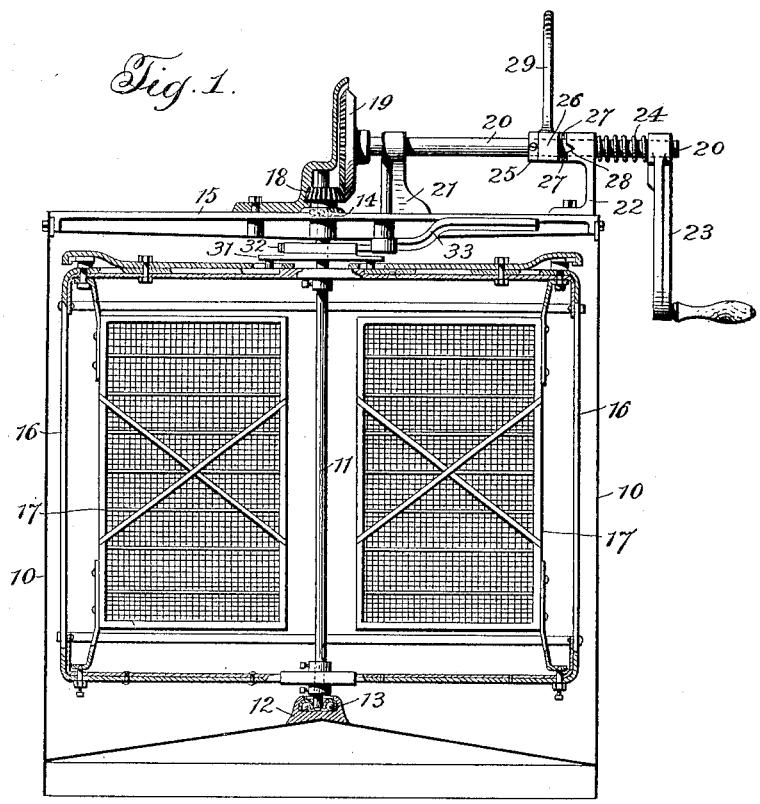
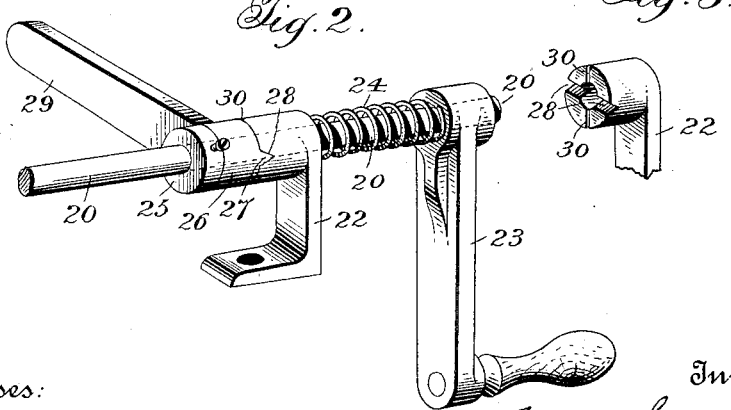
Witnesses:
Jas E. Hutchinson
M. L. Pugh
Inventor:
Frank G. Marbach,
By Chas J Williamson
Attorney

UNITED STATES PATENT OFFICE.

FRANK GEORGE MARBACH, OF MEDINA, OHIO, ASSIGNOR TO THE A. I. ROOT COMPANY, OF MEDINA, OHIO.

GEARING.

1,089,065. Specification of Letters Patent. Patented Mar. 3, 1914.

Application filed May 8, 1909. Serial No. 494,850.

*To all whom it may concern:*

Be it known that I, FRANK GEORGE MARBACH, of Medina, in the county of Medina, and in the State of Ohio, have invented a certain new and useful Improvement in Gearing, and do hereby declare that the following is a full, clear, and exact description thereof, reference being had to the accompanying drawings, in which—

Figure 1 is a view partly in side elevation and partly in section of a honey extractor embodying my invention; Fig. 2 a detail view in perspective of the clutch mechanism and Fig. 3 a detail view.

My invention relates to centrifugal honey extractors of the type shown in United States Patent No. 787,104, issued April 11, 1905, to my assignee, the A. I. Root Company, and the object of my invention is to enable the driver of the rotary baskets to be disconnected at will and quickly, so as to leave the rotary baskets free to revolve, unencumbered as much as possible, from momentum, and thus save or economize the labor or power required to operate the machine, and to this end my invention consists in the honey extractor constructed substantially as hereinafter specified and claimed.

To illustrate my invention I show it as embodied in a honey extractor, constructed like that of the patent above referred to, it comprising a cylindrical casing or tank 10, at the center of which is a vertical shaft 11 supported at its lower end in a step bearing 12 that contains anti-friction rollers or balls 13 to reduce friction to a minimum, said shaft near its upper end being journaled by anti-friction rollers or ball bearings 14 in a diametrically extending cross bar 15 that at its ends is bolted to the rim of the tank 10. The shaft 11 has secured to it a frame 16 to which, as usual, are secured the comb-holding baskets 17. Above the cross bar 15, the shaft has fixed to it a bevel pinion 18 with which meshes a bevel gear 19 upon a horizontal shaft 20, which is journaled in bearings in two vertical arms or brackets 21 and 22, respectively, bolted to the upper side of the cross bar, the bracket 22 being near the outer end of said cross bar, and beyond said bracket 22, at its outer end, the shaft has secured to it a rotating means, such as a crank 23, by means of which the horizontal shaft may be revolved, and through the bevel gearing the basket-carrying shaft rotated to the high speed required to expel the honey from the comb by centrifugal force.

It will be evident that with the basket-carrying frame revolving at the desired speed, its rotation will continue from momentum proportionate to the extent to which it is free from retarding forces, and I therefore arrange to disconnect the horizontal shaft 20 and all the parts carried thereby, from the vertical shaft 11, and I do this by making the horizontal shaft 20 longitudinally movable to enable the disengagement of its bevel gear from the bevel pinion, and I will now describe the means I have designed to effect the longitudinal movement of the shaft 20 to cause the disengagement or reëngagement of the bevel gear and pinion. Interposed between the outer side of the outer shaft-supporting bracket 22 and the hub of the crank, is an expanding coil spring 24, whose tendency is to move the shaft longitudinally in the direction to disengage the bevel gear thereon from the pinion on the vertical shaft 11, and to yieldingly hold the gearing disengaged. On the opposite side of the bracket 22 from that against which the coil spring presses, the shaft 20 has secured to it, as by a set screw, a collar 25, between which and the bracket 22 a ring 26 is fitted loosely on the shaft 20, so that ring and shaft may easily turn relative to each other, and on its side next the bracket 22, said ring, preferably at diametrically opposite points, has V-shaped lugs 27 which are respectively adapted to engage V-shaped notches 28 in the contiguous side of the bracket 22, so that when the lugs are seated in the notches, if the ring be turned, the ring will be moved by a cam-like action away from the bracket, and since it engages on its opposite side the collar 25 on the shaft 20, the latter will be moved longitudinally to carry the bevel gear into mesh with the bevel pinion. The V-shaped lugs and notches besides being a very simple means to accomplish this engaging movement of the gear wheel, move the latter only to the extent required to effect proper meshing of its teeth with the teeth of the bevel pinion, so that no undue jamming or crowding of the gear and pinion teeth together can take place.

For the convenient turning of the ring, it is provided with a radial arm or handle 29, and the latter is so situated that it stands in a horizontal position when the lugs and notches are in engagement, and it is preferably moved to a vertical position when turning the ring to effect the engagement or meshing of the gear wheel and pinion, in which position the ring is latched by a slight groove or depression 30 in the side of the bracket in which the apex of each lug is seated. To effect the disengagement of the driver shaft, it is necessary merely to swing the handle 29 to a horizontal position, whereupon by the action of the spring, the shaft 20 will automatically be moved longitudinally outward, carrying with it the bevel gear, and this operation can be very easily and quickly performed. The reëngagement or meshing of the bevel gear and pinion can be as readily and expeditiously accomplished.

A very important, if not essential, factor in getting the best results from the disengagement of the driver from the basket-carrying shaft as far as the effect of revolution of the latter and its parts from momentum is concerned, is anti-friction or other form of bearings for the vertical shaft which will impede the revolution of the baskets as little as possible.

For checking or stopping the revolution of the vertical shaft, a brake is provided that consists of a disk 31 near the upper end of the shaft, and a friction strap 32 which is operable by a lever 33 pivoted to the under side of the diametrically extending cross bar 15.

Having thus described my invention, what I claim is—

1. The combination of a power shaft, a shaft to be driven, intermeshing gear wheels on the respective shafts, said power shaft being longitudinally movable to place its gear into and out of mesh with the gear on the driven shaft, means for moving said shaft longitudinally and holding it in the position to which it is moved, and bearings for said driven shaft in which it is adapted to run free after the disconnection of said gears, a frame carried by the driven shaft, the momentum of the frame after the disconnection of the gears serving to continue the rotation of the driven shaft and the parts carried thereby.

2. The combination of a horizontal power shaft, a vertical shaft to be driven, intermeshing gear wheels on the respective shafts, said power shaft being longitudinally movable to place its gear into and out of mesh with the gear on the driven shaft, means for moving said shaft longitudinally and holding it in the position to which it is moved, comprising a spring acting to move the shaft to place the gears out of mesh, and a hand operated means to move the shaft in opposition to the spring and to cause the meshing of the gears, and bearings for said driven shaft in which it is adapted to run free after the disconnection of said gears, a frame carried by the driven shaft, the momentum of the frame after the disconnection of the gears serving to continue the rotation of the driven shaft and the parts carried thereby.

3. In a centrifugal honey extractor, the combination of the basket-carrying shaft, a power shaft, gear wheels for the two shafts, one of which is movable longitudinally with the power shaft, bearings for the power shaft, a collar on said shaft, a ring interposed between said collar and one of the bearings mounted loosely on the shaft, said ring and said bearing having coacting cam surfaces, and a spring interposed between said bearing and a part on the power shaft on the opposite side of the bearing from the ring.

4. In a centrifugal honey extractor, the combination of the basket-carrying shaft, a power shaft, gear wheels for the two shafts, one of which is movable longitudinally with the power shaft, bearings for the power shaft, a collar on said shaft, a ring interposed between said collar and one of the bearings and loose on the shaft, said ring having lugs with inclined faces to co-act with notches with inclined faces in said bearing, and a turning handle on the ring.

In testimony that I claim the foregoing I have hereunto set my hand.

FRANK GEORGE MARBACH.

Witnesses:
N. S. KELLOGG,
FRANK SPELLMAN.

Copies of this patent may be obtained for five cents each, by addressing the "Commissioner of Patents, Washington, D. C."